(12) United States Patent
Jeong et al.

(10) Patent No.: US 6,917,407 B2
(45) Date of Patent: Jul. 12, 2005

(54) LIQUID CRYSTAL DISPLAY DEVICE AND METHOD OF FABRICATING THE SAME

(75) Inventors: Hun Jeong, Kumi-shi (KR); Hong Soo Kim, Kumi-shi (KR); Bong Rae Cho, Bucheon-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/285,454

(22) Filed: Nov. 1, 2002

(65) Prior Publication Data
US 2003/0123006 A1 Jul. 3, 2003

(30) Foreign Application Priority Data
Dec. 27, 2001 (KR) .......................................... 2001-86063

(51) Int. Cl.$^7$ ........................................... G02F 1/1343
(52) U.S. Cl. ...................................... 349/139; 349/192
(58) Field of Search ................................ 349/139, 143, 349/192, 39; 345/96

(56) References Cited

U.S. PATENT DOCUMENTS

| | | | | |
|---|---|---|---|---|
| 5,285,301 A | * | 2/1994 | Shirahashi et al. | ......... 349/143 |
| 5,946,068 A | * | 8/1999 | Lee et al. | .................... 349/143 |
| 6,429,842 B1 | * | 8/2002 | Shin et al. | ..................... 345/92 |
| 6,587,160 B2 | * | 7/2003 | Lee et al. | ...................... 349/40 |
| 6,636,279 B2 | * | 10/2003 | Takasugi et al. | .............. 349/40 |
| 6,734,939 B2 | * | 5/2004 | Lee et al. | .................... 349/141 |

FOREIGN PATENT DOCUMENTS

KR    2002-92721    12/2002

* cited by examiner

Primary Examiner—Robert H. Kim
Assistant Examiner—David Chung
(74) Attorney, Agent, or Firm—Morgan Lewis & Bockius LLP

(57) ABSTRACT

A liquid crystal display device includes a plurality of gate lines arranged in a first direction and spaced apart at a constant interval, a plurality of data lines arranged in a second direction perpendicular to the gate lines at a constant interval so as to define pixel regions arranged in a matrix configuration, a plurality of pixel electrodes formed in the respective pixel regions, and a dummy data line formed at one side of the pixel electrodes connected to the last data line.

9 Claims, 4 Drawing Sheets

LIQUID CRYSTAL DISPLAY DEVICE AND METHOD OF FABRICATING THE SAME

The present invention claims the benefit of Korean Patent Application No. P2001-86063 filed in Korea on Dec. 27, 2001, which is hereby incorporated by reference.

BACKGROUND OF THE INVENTION

1. Field of the Invention

The present invention relates to a liquid crystal display device, and more particularly, to a liquid crystal display device, which compensates for brightness phenomenon in a last row (or column) data line portion.

2. Description of the Related Art

In general, liquid crystal display (LCD) devices are used as portable display devices due to their lightweight, thin, small, and compact characteristics as compared with other display devices. Notebook personal computers are representatives of LCD devices.

These LCD devices include upper and lower glass substrates and a liquid crystal layer interposed therebetween. On the lower glass substrate are disposed a plurality of gate lines arranged along a direction at a constant interval, a plurality of data lines arranged along a direction perpendicular to the gate lines at a constant interval to define pixel regions arranged in a matrix configuration, a plurality of pixel electrodes formed within the respective pixel regions, and a plurality of thin film transistors formed at the respective pixel regions defined by a cross of the gate line and the data line, for applying a data signal of the data line to the corresponding pixel electrode depending on a signal of the gate lines. In addition, formed on the upper glass substrate are a black matrix layer for preventing incident light from passing through portions other than the pixel regions, a color filter layer for displaying colors in the pixel regions, and a common electrode layer formed on the entire surface of the upper glass substrate including the color filter layer. Interposed between the upper and lower glass substrates is a liquid crystal material layer.

The liquid crystal material layer formed between the upper and lower glass substrates may deteriorate if a DC voltage is applied for a long time. To prevent this deterioration, the polarity of the applied voltage is periodically changed during operation, which is called "polarity inversion driving method." The polarity inversion driving method includes frame inversion, line inversion, column inversion, dot inversion and so forth.

The frame inversion driving method applies a data voltage to the liquid crystal layer such that the polarity of the data voltage with respect to the common electrode voltage is identical in a frame unit. For example, if a data voltage having a positive (+) polarity is applied to even frames, a data voltage having a negative (−) polarity is applied to odd frames. The frame inversion driving method has the advantage that power consumption occurring in the switching operation is small. However, the frame inversion driving method is sensitive to a flicker phenomenon due to asymmetry in the transmittances of the positive and negative polarity. In addition, the frame inversion driving method is susceptible to crosstalk due to interference between data.

The line inversion driving method, which is a type of polarity inversion driving method, is commonly used in low resolution (VGA, SVGA, etc.) display devices, and applies data voltage such that the polarity of the pixel is different in a horizontal line unit. For example, if a data voltage having positive (+) polarity was applied to an odd line, and a data voltage having negative (−) polarity was applied to an even line, a data voltage having negative polarity is applied to an odd line and a data voltage having positive polarity is applied to an even line in the next frame. In the aforementioned line inversion driving method, data voltages having the opposite polarities are applied between adjacent lines, so that a brightness difference between lines decreases due to spatial averaging. Accordingly, the flicker phenomenon is reduced as compared to the frame inversion driving method. In addition, along the vertical direction, data voltages having opposite polarities are distributed, so that a coupling phenomenon between data lines is countervailed. Accordingly, vertical crosstalk is reduced as compared to the frame inversion driving method. However, along the horizontal direction, data voltages having the same polarities are distributed, so that horizontal crosstalk is generated and, since repeating times of the switching increases compared with the frame inversion driving method, power consumption increases.

The column inversion driving method applies data voltage in which polarity is the same along the horizontal direction, but opposite along the vertical direction. Like the line inversion driving method, the column inversion driving method has a smaller flicker phenomenon and a smaller horizontal crosstalk as compared to the frame inversion driving method due to spatial averaging. However, since the column inversion driving method has to apply data voltages having opposite polarities between vertically adjacent lines, a high voltage column drive IC is required.

The dot inversion driving method, which is a type of polarity inversion driving method, is applied to high resolution (XGA, SXGA, UXGA) display devices. In the dot inversion driving method, the data voltages of adjacent pixels along omnibus directions have opposite polarities. Accordingly, the dot inversion driving method minimizes the flickering phenomenon by using spatial averaging, but has a disadvantage in that a high voltage drive IC has to be used and power consumption is very high.

In FIG. 1 is a layout diagram of a liquid crystal display device according to the related art. FIG. 1 a LCD device includes a plurality of gate lines 1 arranged along a first direction and spaced apart at a constant interval, and a plurality of data lines 2 arranged along a second direction perpendicular to the gate lines at a constant interval, thereby forming pixel regions arranged in a matrix configuration. A plurality of pixel electrodes 3 are formed within the respective pixel regions, and a plurality of thin film transistors 4, for applying a data signal of the data line to the corresponding pixel electrode, are formed at the respective pixel regions defined by a cross of the gate line and the data line. The pixel electrodes are formed within the pixel regions defined by gate lines 1 and data lines 2. In addition, most pixel electrodes 3 have data lines 2 at both sides thereof, but the pixel electrodes located in the last row (i.e., right end) have a data line 2 only at one side. Thus, the pixel regions located at the right end have a different brightness and coupling influence than the pixel regions located elsewhere.

FIG. 2 is an exemplary equivalent circuit diagram of a subpixel of the last data line in a liquid crystal display device according to related art. In FIG. 2, subpixels of the last data line of FIG. 1 in the pixel region immediately before the right end data line, a capacitor ($C_{LC}$) is formed between the pixel electrode and the common electrode, a storage capacitor ($C_{st}$) is formed between the prior gate line 1 and the pixel electrode 3, a parasitic capacitor ($C_{dpl}$) is formed between the left data line 2 and the pixel electrode 3, and a parasitic capacitor ($C_{dpr}$) is formed between the right end data line 2 and the pixel electrode 3. However, in the pixel region of the right end data line, a parasitic capacitor ($C_{dpr}$) is not formed between the right end data line 2 and the pixel electrode 3. Accordingly, the pixel regions of the right end data line have different capacitances than the remaining pixel regions, causing the pixel regions of the right end data line to be displayed brighter than the remaining pixel regions.

SUMMARY OF THE INVENTION

Accordingly, the present invention is directed to a liquid crystal display device and method of fabricating the same that substantially obviates one or more problems due to limitations and disadvantages of the related art.

An object of the present invention is to provide a liquid crystal display device and a method of fabricating the same in which a dummy data line is formed at one side of a pixel electrode arranged in a last row to compensate for the screen brightness.

Additional features and advantages of the invention will be set forth in part in the description which follows, and in part will be apparent from the description or may be learned by practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein a liquid crystal display device includes a plurality of gate lines arranged in a first direction and spaced apart at a constant interval, a plurality of data lines arranged in a second direction perpendicular to the gate lines at a constant interval so as to define pixel regions arranged in a matrix configuration, a plurality of pixel electrodes formed in the respective pixel regions, and a dummy data line formed at one side of the pixel electrodes connected to the last data line.

In another aspect of the invention, a liquid crystal display device includes a plurality of gate lines arranged along a first direction, a plurality of data lines arranged along a second direction perpendicular to the gate lines defining a plurality of pixel regions arranged in a matrix configuration, a plurality of pixel electrodes formed within the respective pixel regions, and a dummy data line formed at one side of the pixel electrodes connected to the last data line.

In another aspect of the invention a method of fabricating a liquid crystal display device includes the steps of forming a plurality of gate lines arranged along a first direction and spaced apart at a constant interval, forming a plurality of data lines arranged along a second direction perpendicular to the gate lines at a constant interval defining a plurality of pixel regions arranged in a matrix configuration, forming a plurality of pixel electrodes within the respective pixel regions, and forming a dummy data line at one side of the pixel electrodes connected to the last row data line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
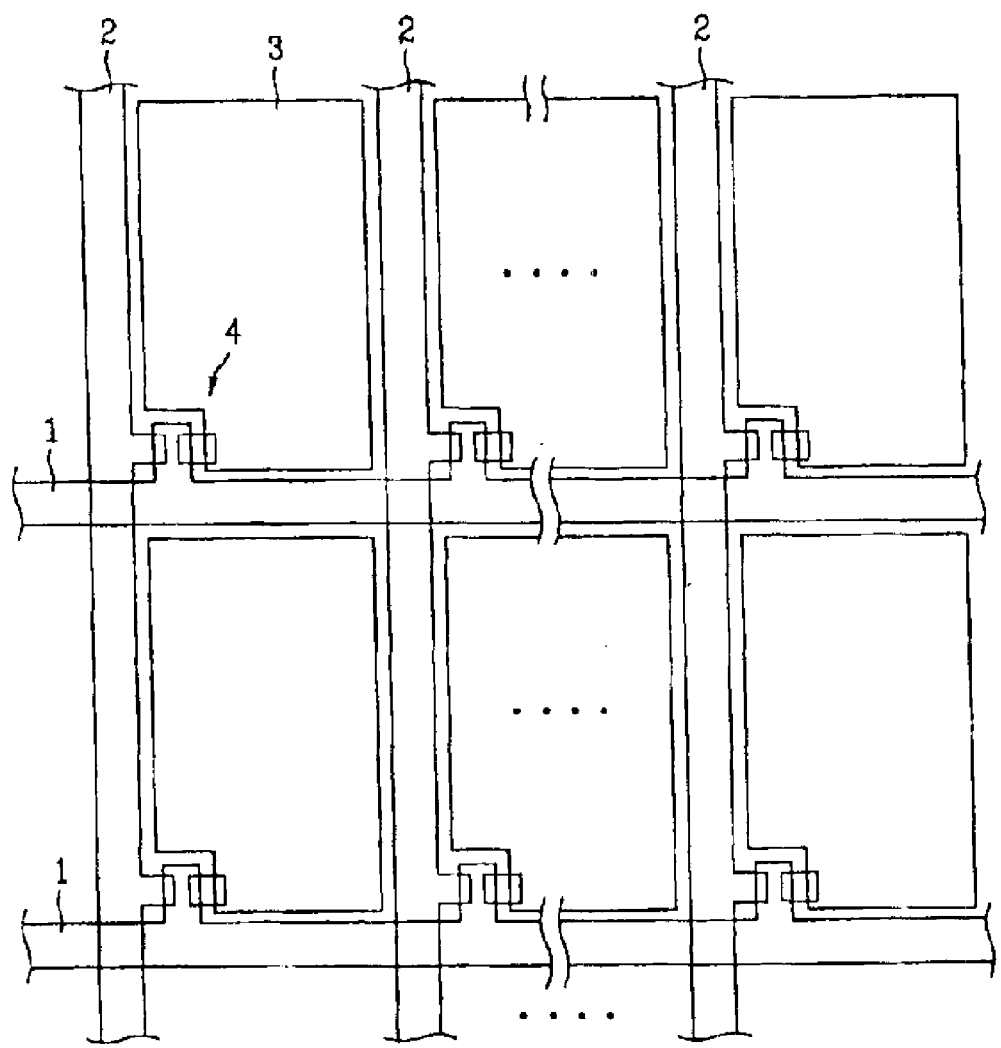
FIG. 1 is a layout diagram of a liquid crystal display device according to the related art.
Figure 2:
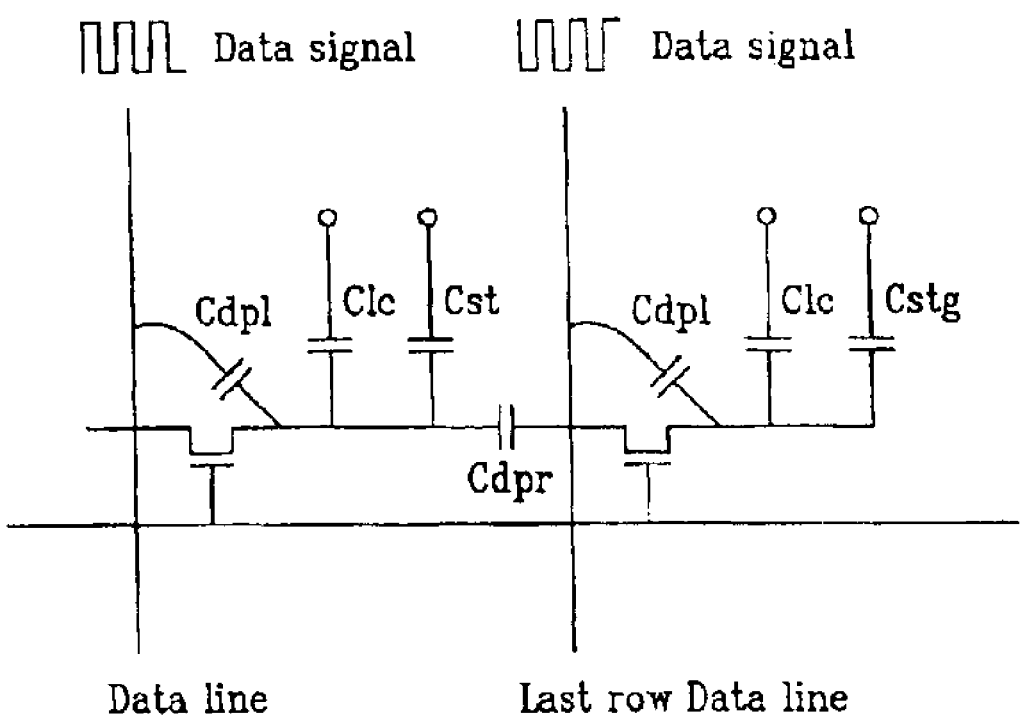
FIG. 2 is an exemplary equivalent circuit diagram of a subpixel of the last data line in a liquid crystal display device according to related art.
Figure 3:
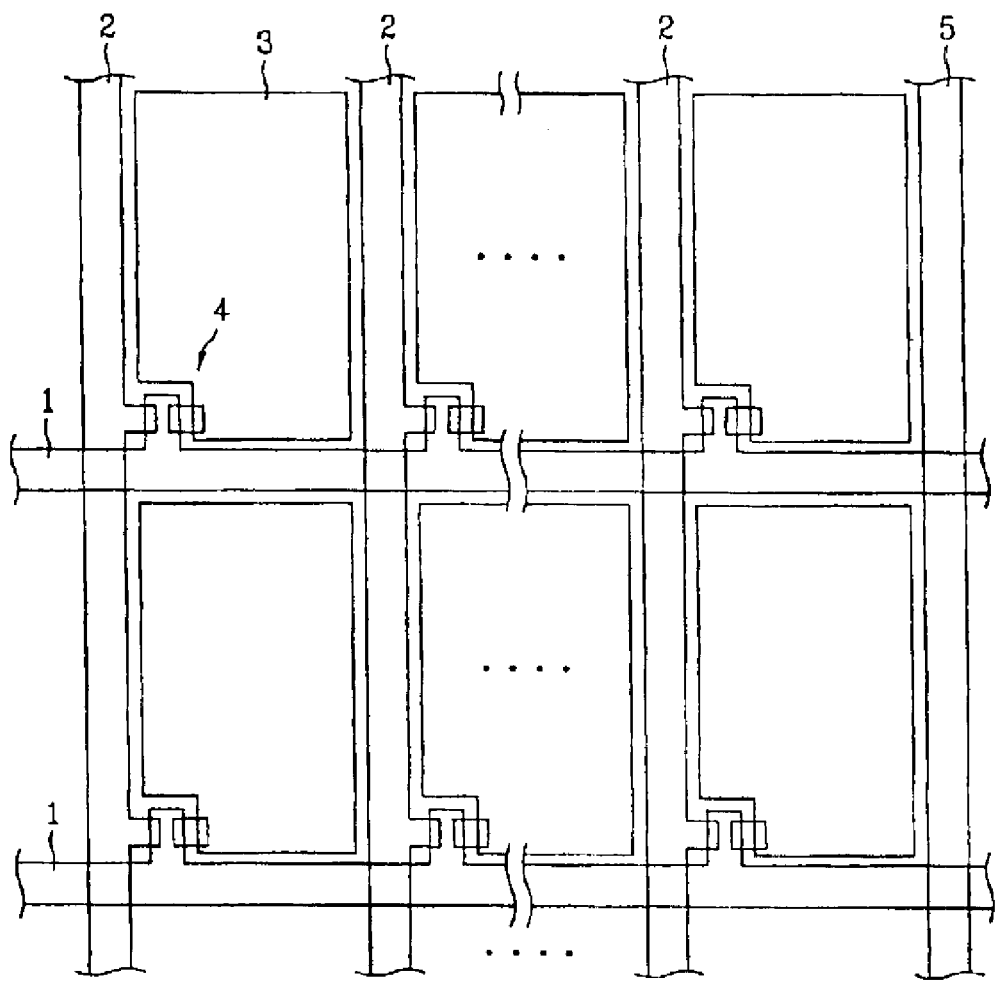
FIG. 3 is a layout diagram of an exemplary liquid crystal display device according to the present invention.

FIG. 3 is a layout diagram of an exemplary liquid crystal display device according to the present invention. In FIG. 3 a plurality of gate lines 1 may be arranged along a first direction on a glass substrate (not shown) and spaced apart at a constant interval, a plurality of data lines 2 may be arranged along a second direction perpendicular to the gate lines and spaced apart at a constant interval, thereby forming pixel regions arranged in a matrix configuration. A plurality of pixel electrodes 3 may be formed within the respective pixel regions, and a plurality of thin film transistors 4 may be formed at the respective pixel regions, for applying a data signal of the data line to the corresponding pixel electrode. A dummy data line 5 may be formed at one side of the pixel electrodes 3 that is connected to the last data line 2.

Figure 4:
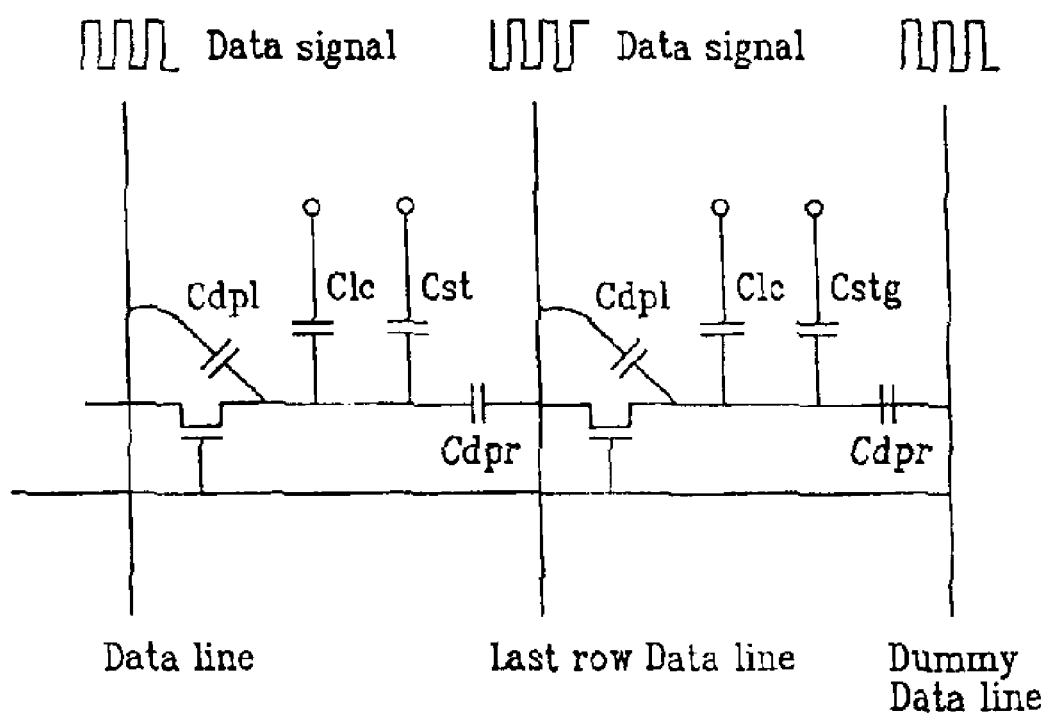
FIG. 4 is an exemplary equivalent circuit of a subpixel of the last data line in a liquid crystal display device according to the present invention.

FIG. 4 is an exemplary equivalent circuit of a subpixel of the last data line in a liquid crystal display device according to the present invention. In FIG. 4, the data lines 2 may be formed at both sides of each of the pixel electrodes 3. For example the data line 2 and the dummy line 5 may be formed at both sides of the pixel electrode of the pixel region defined by the last data line 2. Since the data line 2 and the dummy data line 5 may be formed at both sides of the pixel electrode 3 of the pixel region defined by the last data line 2, the pixel electrode of the last data line may be subject to the same coupling influence as the remaining pixel electrodes.

FIG. 4 is an exemplary equivalent circuit of a subpixel of the last data line in a liquid crystal display device according to the present invention. In FIG. 4 in a pixel region right before the last row data line, a capacitor ($C_{LC}$) may be formed between the pixel electrode 3 and the common electrode, a storage capacitor ($C_{st}$) may be formed between the prior column gate line 1 and the pixel electrode 3, a parasitic capacitor ($C_{dpl}$) may be formed between the left data line 2 and the pixel electrode 3, and a parasitic capacitor ($C_{dpr}$) may be formed between the last row data line 2 and the pixel electrode 3. In addition in the pixel region of the last row data line 2, a parasitic capacitor ($C_{dpr}$) may be formed between the dummy data line 5 and the pixel electrode 3. Accordingly, the pixel region of the last row data line may have the same capacitance as the other pixel regions, and may have the same brightness as the remaining pixel regions.

Furthermore, the same data signal applied to the data line right before the last row data line may be applied to the dummy data line 5 to drive the LCD device in the dot inversion driving method or in the column inversion driving method. Accordingly, the dummy data line 5 may be electrically connected to the data line right before the last row data line.

It will be apparent to those skilled in the art that various modifications and variations can be made in the liquid crystal display device and method of fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a plurality of gate lines arranged along a first direction and spaced apart at a constant interval;
   a plurality of data lines arranged along a second direction perpendicular to the gate lines at a constant interval to define a plurality of pixel regions arranged in a matrix configuration;
   a plurality of pixel electrodes formed within the respective pixel regions; and
   a dummy data line formed adjacent to one side of the pixel electrodes connected to the last data line, wherein there is no liquid crystal display element adjacent to one side of the dummy data line and the dummy data line is connected to a data line prior to the last data line.

2. The device according to claim 1, further comprising a plurality of thin film transistors formed regions defined by a cross of the gate line and the data line for applying a data signal of the data line to one of the pixel electrodes.

3. The device according to claim 1, wherein a data line signal applied to a data line prior to the last data line is applied to the dummy data line.

4. A liquid crystal display device comprising:
   a plurality of gate lines arranged along a first direction;
   a plurality of data lines arranged along a second direction perpendicular to the gate lines defining a plurality of pixel regions arranged in a matrix configuration;
   a plurality of pixel electrodes formed within the respective pixel regions; and
   a dummy data line formed adjacent to one side of the pixel electrodes connected to the last data line, wherein there is no liquid crystal display element adjacent to one side of the dummy data line and the dummy data line is connected to a data line prior to the last data line.

5. The device according to claim 4, further comprising a plurality of thin film transistors regions defined by a cross of the gate line and the data line for applying a data signal to one of the pixel electrodes.

6. The device according to claim 4, wherein a data line signal applied to a data line prior to the last data line is applied to the dummy data line.

7. A method of fabricating a liquid crystal display device comprising the steps of:
   forming a plurality of gate lines arranged along a first direction and spaced apart at a constant interval;
   forming a plurality of data lines arranged along a second direction perpendicular to the gate lines at a constant interval to defining a plurality of pixel regions arranged in a matrix configuration;
   forming a plurality of pixel electrodes within the respective pixel regions; and
   forming a dummy data line adjacent to one side of the pixel electrodes connected to the last row data line, wherein there is no liquid crystal display element adjacent to one side of the dummy data line and the dummy data line is connected to a data line prior to the last data line.

8. The method according to claim 7, further comprising the step of forming a plurality of thin film transistor regions defined by a cross of the gate line and the data line for applying a data signal of the data line to one of the pixel electrodes.

9. The method according to claim 7, wherein a data line signal applied to a data line prior to the last data line is applied to the dummy data line.

* * * * *